United States Patent [19]

Offerman

[11] 4,009,144
[45] Feb. 22, 1977

[54] SPRAYABLE DECORATIVE COATING COMPOSITION

[75] Inventor: Sidney Offerman, Great Neck, N.Y.

[73] Assignee: Grow Chemical Corporation, New York, N.Y.

[22] Filed: Aug. 21, 1975

[21] Appl. No.: 606,450

Related U.S. Application Data

[62] Division of Ser. No. 338,601, March 6, 1973, Pat. No. 3,929,692.

[52] U.S. Cl. .................. 260/40 R; 260/29.1 R; 260/29.2 E; 260/37 R; 260/37 N; 260/857 UN
[51] Int. Cl.² ................. C08K3/00; C08L 67/00
[58] Field of Search ............. 260/37, 40, 29.1 R, 260/29.2 E, 857

[56] References Cited

UNITED STATES PATENTS

| | | | |
|---|---|---|---|
| 3,759,852 | 9/1973 | Bradley | 260/18 EP |
| 3,929,692 | 12/1975 | Offerman | 260/7.5 |

OTHER PUBLICATIONS

Chem. Absts., 78:45216b, "Compositions—Coating Building Units", Kingston, 1972.
Chem. Absts., 79:137971t, Takenobu.
Chem. Absts., 72:47049z, "Heat and Sound Insulation for Concrete", Ely.
World Surface Coating Absts.: vol. 45 (1972) 1026, "Paint—Strength;" Toray Indust.
World Surface Coating Absts.: vol. 44 (1971) 301, "Coatings—Syth. Fibers—Walls;" Heintze.

*Primary Examiner*—Edward M. Woodberry
*Attorney, Agent, or Firm*—Burton, Parker & Schramm

[57] ABSTRACT

A minor amount of staple synthetic fibrous material such as nylon or dacron dispersed in a paint pigment of the type including magnesium silicate, titanium dioxide and/or calcium carbonate; or dispersed in a sprayable paint formulation of the type comprised of a liquid medium containing sizing and binding agents and particularly adapted for spray deposition on unfinished interior concrete surfaces and the like to provide a decorative sealing coating thereon having flame-retardant and/or acoustical properties.

4 Claims, No Drawings

SPRAYABLE DECORATIVE COATING COMPOSITION

This is a division, of application Ser. No. 338,601 filed Mar. 6, 1973 now U.S. 3,929,692.

BACKGROUND OF THE INVENTION

In recent years, public authorities have been gradually tightening controls on various industrial processes for the improved safety of the workers involved in carrying out the processes, while maintaining at least minimal equivalent benefit to those for whom the processes are carried out. Health and safety hazards are continually and increasingly influencing the revision of labor safety standards and one example thereof is the current regulation, in some cities, prohibiting the use of asbestos-containing compositions which create during use an environment for the workers containing suspended carcinogenic asbestos particles that may be inhaled by the workers and contribute to respiratory infections that may have ultimate fatal consequences or undesirable side effects.

In New York City, for example, asbestos-containing sprayed coatings for unfinished interior wall surfaces of concrete or cinder blocks or the like are now banned and building contractors have been engaged in a widespread search for equivalent substitutes that will not only be acceptable functionally, i.e. in the process of handling, deposition and in use, but also will have at least generally comparable economics.

It is therefore an object of the present invention to provide a substitute non-toxic sprayable coating formulation for covering rough unfinished interior wall surfaces that is generally equivalent to the prior formulations containing asbestos and like materials; to provide such a composition having flame-retardant and/or acoustical properties; to provide such a composition having improved adhesion, weathering properties, susceptibility to decorative embossing techniques and coloring pigmentation, as well as chamical resistance and enhanced aging properties; to provide economic advantages over prior similar compositions; to provide a pigment formulation that can be incorporated with additional constituents to produce a sprayable paint composition meeting some or all of the foregoing objectives. Other objects and features will become apparent in the following description and in the appended claims.

BRIEF SUMMARY OF THE INVENTION

The present invention is based on the discovery that the inclusion of staple lengths of synthetic fibers such as polyamides (nylon) or polyesters (dacron) in pigment compositions, or in sprayable coating compositions, provides a substitute for the asbestos-containing materials of the prior art having certain improved properties and advantages over the prior materials and compositions.

In essence, the composition of the present invention comprises a minor proportion by weight of synthetic fibers dispersed in a liquid medium containing sizing and binding agents as well as other additives, as desired, for selective pigmentation, etc. The formulation is non-toxic in the sense causing prohibition of asbestos-containing formulations as aforesaid, yet is equivalent in processing, handling and end use while the cost is the same or even less.

DESCRIPTION OF THE PREFERRED EMBODIMENTS

In accordance with the invention, the utilization of synthetic fibers is as a replacement for the mineral fibers in asbestos and talc in sprayable coating compositions. Generally the synthetic fibers will be polyamide fibers such as nylon or polyester fibers such as Dacron and preferably such fibers will be in staple lengths, e.g. about one-quarter inch, and for example, about 15 denier although any size or length may be employed as dictated by the end result desired as long as it is compatable with and can be processed by the deposition equipment or means to be employed.

Only a minor amount of the fibrous material need normally be employed. For example, about two pounds of fiber in 100 gallons of total formulation will suffice for conventional coating applications. Increased amounts, e.g. ten to fifteen, even twenty pounds, or more, may be used if special effects, decorative or otherwise, are intended. The lower amount specified will provide a coating composition with sufficient film thickness and continuity, as well as high build-up potential, to give conventional results with consequent flame-retardant and/or acoustical characteristics to the finished surface.

The basic formulation also normally includes a whitener such as titanium dioxide or other conventional pigment; calcium carbonate, magnesium silicate, or the like; a bodying agent for desired viscosity such as Cellosize (trademark of Union Carbide for hydroxy ethyl cellulose); ethylene glycol to contribute to the film-forming properties of the coating compositions as well as to inhibit or retard the water evaporation rate and lower the freezing point; Carbitol Acetate (trademark of Union Carbide for diethylene glycol monoethyl ether acetate) or other surfactant; water as the principal suspension medium or carrier; and polyvinyl alcohol for the principal film-forming constitutent. Some typical formulations containing the above materials are as follows:

| Formulation I | |
|---|---|
| | Pounds |
| Polyester fibers, 15 deniers, staple length (dacron) | 6 |
| Titanium Dioxide | 300 |
| Calcium Carbonate | 1500 |
| Cellosize | 8 |
| Ethylene Glycol | 50 |
| Carbitol Acetate | 12 |
| Polyvinyl Alcohol (55%) | 825 |
| Water | 750 |

| Formulation II |
|---|
| Same as I, but containing six pounds of nylon fibers instead of dacron. |

| Formulation III | |
|---|---|
| Calcium Carbonate | 50 |
| Pearlite | 100 |
| Mica | 50 |
| Cellosize | 2 |
| Calcium Silicate | 200 |
| Titanium Dioxide | 25 |
| Polyester Fibers (dacron) | 2 |
| Water | (50 gallons) |
| Polyvinyl Alcohol | (balance to make 100 gallons of finished composition) |

| Formulation IV |
|---|
| (Pigment pre-mix formulation) |

| -continued | |
| --- | --- |
| Dacron Fibers | 1.5 – 2.0 |
| Magnesium Silicate | 200.0 |

| Formulation V | |
| --- | --- |
| (Pigment pre-mix) | |
| Nylon Fibers | 1.5 – 2.0 |
| Magnesium Silicate | 200.0 |
| Calcium Carbonate (ground limestone, commercial grade) | 50 – 500.0 |

Formulations IV and V are used to form the basis for final sprayable formulations similar to those exemplified by I through III above and may contain the additional surfactant, bridging material, film-forming enhancer, etc. of the final compositions if desired, their utility being the provision of a pre-mix that contains all the necessary ingredients for a formulation according to the present invention except those bulky materials such as limestone, water, polyvinyl alcohol, etc.

All of the above sprayable compositions can be prepared by using conventional apparatus and techniques as practiced in the past heretofore with the asbestos-containing formulations, and the spraying and handling equipment can be the same.

In the water or other suspending or dispersion medium one may also incorporate materials, alone or in partial substitution, such as acrylic resinous materials, polyvinyl acetate, casein butadiene-styrene mixtures, soya protein, etc. The suspension medium itself may include or be constituted by toluol, xylol, alphatic or aromatic liquid hydrocarbons such as pentane, hexane, benzene, etc.; alkyds, phenols, rosin, etc., depending on whether non-flammable or flammable materials may be used.

The above formulations provide means for building up a succession of coating layers to a substantial thickness with consequent mildew-proof, flame-retardant and acoustical properties. Depending on the final thickness, certain embossed or sculptured, decorative effects can be achieved that were not possible with prior materials. Any color pigments can be employed. The fibers are readily adaptable to any desired pigmentation and require substantially less than the asbestos materials because of their initial inherent whiteness and/or transparency. It is also conceivable that the thermoplastic character of the fibers may be utilized if hot spraying is feasible and desired.

The case can be said to be directed toward a spray coating composition for imparting flame retardant and acoustical properties to building interior wall surfaces and the like, comprising a minor amount of synthetic fibrous material suspended in a liquid medium containing sizing and binding agents. More particularly, the composition can contain about 2 pounds of synthetic fibers selected from the group consisting of polyamides and polyesters suspended in 100 gallons of liquid mixture containing about 50 gallons of a suspension medium selected from the group consisting of water, toluol, xylol, alkyd resin and oleoresin, 50 pounds of a slightly soluble alkali metal salt of a weak acid such as calcium carbonate, at least 50 pounds of a mineral binder such as mica, and about 200 pounds of an alkali silicate such as calcium silicate. Further, the composition can include 2 pounds of Cellosize, 25 pounds of titanium dioxide pigment whitener, 100 pounds or pearlite and 8 gallons of a 55% solution of polyvinyl alcohol. The composition can also contain, per 100 gallons of liquid mixture, about 2 to 20 pounds of fibers, about 2 pounds of hydroxy ethyl cellulose and about 50 to about 1500 pounds of calcium carbonate.

While certain embodiments and formulations according to the present invention have been described above, it is to be understood that changes, additions and revisions may be made to the above formulations and pre-mixes, as well as the techniques and processes, without departing from the scope and spirit of the invention.

What is claimed is:

1. A pre-mix additive composition for a sprayable liquid coating material for unfinished concrete to seal the same and enhance the acoustical and flame retardant properties thereof comprising calcium carbonate, synthetic fibrous material selected from the group consisting of polyamides and polyesters and silicates selected from the group consisting of magnesium silicate and calcium silicate.

2. The composition of claim 1 wherein the components are present on a parts weight basis as follows:
   Calcium Carbonate About 50 to about 1500
   Fibrous Material About 200
   Silicate About 1.5 to about 2.0

3. The composition of claim 1 wherein the fibrous material is of staple length.

4. The composition of claim 1 wherein the fibrous material has a staple length of about one-quarter inch.

* * * * *